(12) United States Patent  
Zehler

(10) Patent No.: US 7,631,033 B2  
(45) Date of Patent: Dec. 8, 2009

(54) HOSTED METHOD AND SYSTEM FOR AUTOMATED PROXY CREATION OF DEVICE RESIDENT SERVICES

(75) Inventor: Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1096 days.

(21) Appl. No.: 10/342,848

(22) Filed: Jan. 15, 2003

(65) Prior Publication Data

US 2004/0136027 A1      Jul. 15, 2004

(51) Int. Cl.  
  *G06F 15/16* (2006.01)
(52) U.S. Cl. .................. 709/201; 709/202; 709/203
(58) Field of Classification Search .................. None  
See application file for complete search history.

(56) References Cited

U.S. PATENT DOCUMENTS

| | | | |
|---|---|---|---|
| 5,832,191 A | 11/1998 | Thorne | |
| 5,898,823 A | 4/1999 | Sorkin et al. | |
| 5,960,167 A | 9/1999 | Roberts et al. | |
| 6,163,793 A | 12/2000 | Gerber et al. | |
| 6,604,140 B1 * | 8/2003 | Beck et al. | 709/226 |
| 6,628,965 B1 * | 9/2003 | LaRosa et al. | 455/557 |
| 6,643,650 B1 * | 11/2003 | Slaughter et al. | 707/10 |
| 6,970,869 B1 * | 11/2005 | Slaughter et al. | 707/10 |
| 7,009,941 B1 * | 3/2006 | Uchino | 370/254 |
| 7,142,128 B2 * | 11/2006 | Kobayashi | 340/825.52 |
| 7,177,867 B2 * | 2/2007 | Stringer-Calvert et al. | 707/9 |

* cited by examiner

*Primary Examiner*—Patrice Winder  
*Assistant Examiner*—Azizul Choudhury  
(74) *Attorney, Agent, or Firm*—Fay Sharpe LLP

(57) ABSTRACT

A system and method provides automated creation of device resident services. A host computer includes an advertisement listener that receives device service advertisements. One or more service generator processes receive information about the advertised device services and create hosted services acting as proxies for the device services. One or more peripheral devices are linked to the host computer, with each device including a device service. The device advertises the device service to the host computer and provides a device service description describing capabilities of the device and device service to the service generator. A directory service maintains service entries for the hosted services published by the service generators. Clients may search for and select a required service in the directory service table, and the service entries serve as links to the corresponding hosted services which may then be used by the client. A selected hosted service may enhance the corresponding device service and provide augmented services to the client.

18 Claims, 2 Drawing Sheets

HOSTED METHOD AND SYSTEM FOR AUTOMATED PROXY CREATION OF DEVICE RESIDENT SERVICES

BACKGROUND OF THE INVENTION

Modern computer systems, personal computer systems, are often characterized by a main computer or a host device to which one or more peripheral devices may be coupled. Typical peripheral devices that might be used in such a system include keyboards, pointing devices, monitors, printers, mass storage devices, and audio or visual input/output devices. In the past, device drivers, programs or routines which control or manage the flow of data to and from peripheral devices, have been used to control these peripheral devices. Recently, because of improved technology, these devices have become more sophisticated and are now able to offer their own services. For example, modern printers may be able to accept documents in a multitude of formats beyond the native format that the printer normally accepts. Printers capable of printing postscript documents are an example. However, current and future printers may offer additional transformation and document services.

Many peripheral devices are able to advertise their services through an advertising protocol offered by the device. Current implementations, however, do not necessarily make use of the advertising protocol. Instead, the implementation might bind to the device and then the host computer itself creates the service that is offered to users. In computer programming in general, the term bind refers to making an association between two or more programming objects or value items for some scope of time and place. As used herein, the terms bind and bound refer to a program connection between a device and a host, or between a device and a user.

As peripheral devices become more complex, devices such as printers are able to not only advertise print services, but are also able to offer these print services on their own without being bound to the host. These devices can act as a peer on a network in the network's environment. This is particularly important considering the explosive growth of computer networks in industry and in the home. When a printer or other device is connected to a computer that is connected to a local area network, a wide area network or even the Internet, the device is able to advertise its services and offer its services to a multitude of computers. Under the current paradigm, the user would look for a particular service by searching and listening for advertisements from a device and then interface with the device and allow the device to directly offer the desired service. The current paradigm, however, has several weaknesses. For example, allowing users to communicate directly with connected devices might create security weaknesses in the system. As another example, a system might have a plurality of printers attached serving as a pool of printers for users. However, the users are unable to take advantage of this in an efficient manner because the users must communicate with individual printers and there is no scheduling mechanism to distribute the load of printing across the individual printers in the pool of printers. Furthermore, the user is limited to the capabilities of the individual printers.

SUMMARY OF THE INVENTION

In one implementation, a method and system is provided for automated proxy creation of device resident services on a computer system. An advertisement listener listens for device service advertisements provided by connected peripheral devices having device services therein. The advertisement listener informs a service generator of a located device service and the service generator retrieves a device service description for the device service from the associated device. The service generator creates a hosted service, wherein the hosted service acts as a proxy for the device service. The hosted service may be augmented to provide capabilities not available in the device service, and the hosted service may utilize other hosted services in providing service to the client. The service generator also publishes a service entry describing the capabilities of the hosted service. A client searches for a required service and the service entry provides a link to the hosted service. The client then requests services from the hosted service, and the service is performed by the hosted service acting alone, the device service acting alone or the hosted service and device service acting jointly.

DETAILED DESCRIPTION OF THE PREFERRED EMBODIMENT

Figure 1:
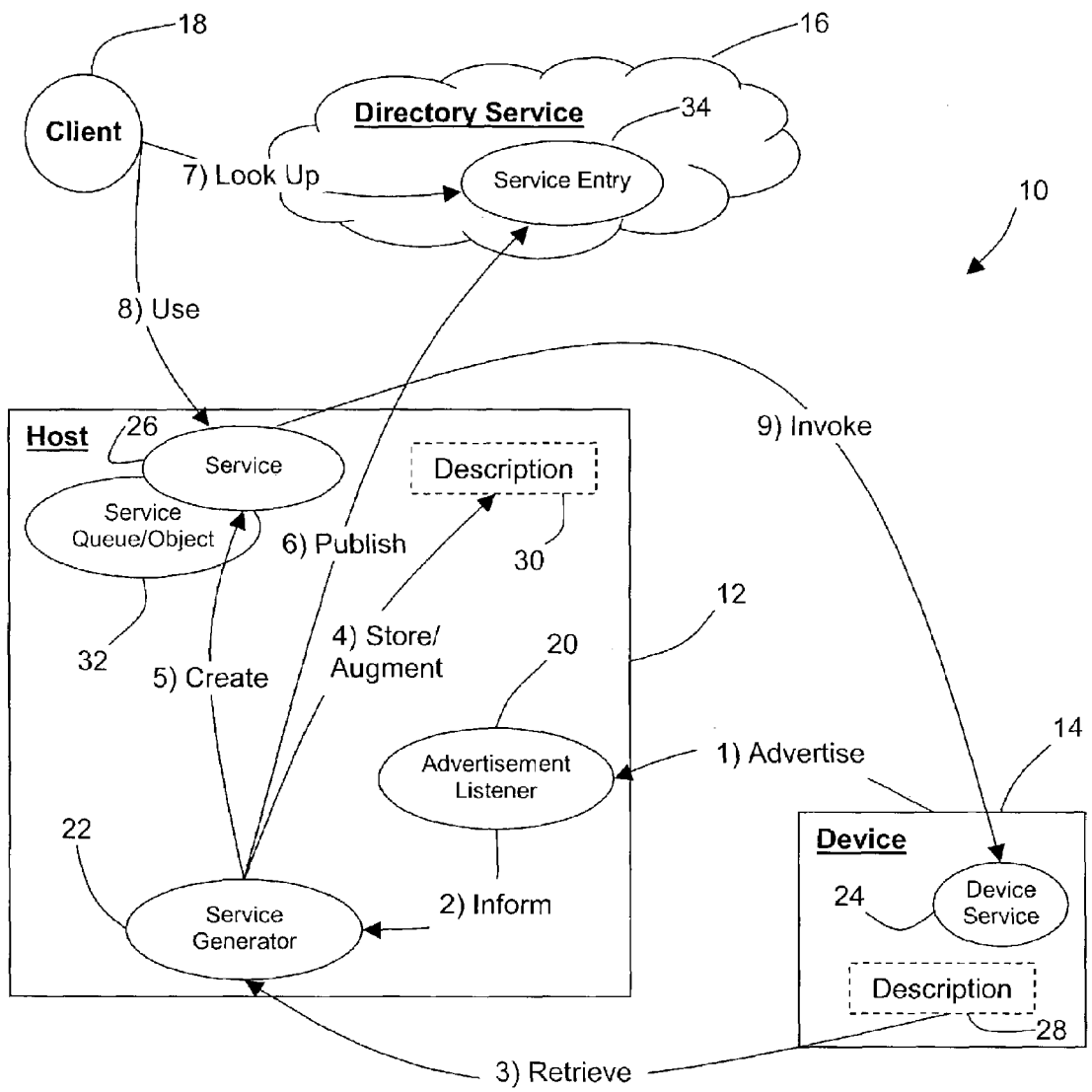
FIG. 1 is a networked computer system suitable for incorporation of embodiments of the present invention.

It will become evident from the following discussion that embodiments of the present application set forth herein, are suited for use in a wide variety of applications, and are not necessarily limited in application to the printing and copying systems described herein.

In existing network-connected computing systems, devices such as printers, scanners and other multi-function devices often externalize their capabilities by advertising and providing services directly on a network. While this method may work fine with small administered environments or environments connected to a small local area network (LAN), in enterprise systems connected to larger LANs, wide area networks or large networks such as the Internet, more control is often required in order to install or augment basic services. This has become a particularly important issue with the rapid deployment of networks in enterprise environments and home environments in view of the multitude of networking methods and systems available in the industry today.

The present application describes an apparatus and method whereby network-connected multi-function devices can advertise their services in a secure manner, wherein the services can be offered in a controlled environment, and wherein their services can be easily augmented to provide composite services. In order to better understand the environment to which concepts of the present invention may be applied, a brief discussion of directory concepts and some of the networking systems available today is provided to aid in understanding concepts of the present application.

Directory Service: When a multi-function device such as a printer offers a network service, the network service is often made known to users by means of a directory service. A directory service associates names with objects and also allows such objects to have attributes. Besides being able to look up an object by its name, a user can also get the object's attributes or search for the object based on its attributes. The directory service provides operations for creating, adding, removing and modifying the attributes associated with objects in a directory.

Directory: A directory is a connected set of directory objects. Many examples of directory services are presently available. For example, Novell Directory Service (NDS) is a directory service from Novell that provides information about many networking services such as file and print services. Another example is Network Information Service (NIS) that has a directory service available on the Sun Solaris operating system for storing system-related information such as that related to machines, printers, users, networks, and other such objects. Then there is the Netscape directory which is a general purpose directory service based on the Internet standard lightweight directory access protocol (LDAP).

Directory Object: A directory object represents an object in a computing environment and that directory object can be used, for example, to represent a printer, a person, a computer, or any such object on the network or even the network itself. The directory object usually contains attributes that describe the object that it represents and the capabilities of that object. For example, a network-connected printer might be represented by a directory object that has attributes such as speed, resolution and color.

When the name of a directory object is known, a user can look up that object in a directory by supplying its name to the directory service. Alternatively, many directories, such as those based on the LDAP protocol, support the notion of searches. When a user searches, the user is not limited to searching by name, but instead, a query may be constructed consisting of a logical expression in which the user specifies the attributes that the object or objects must have. This type of query is called a search filter. This style of searching is sometimes called reverse-lookup or content-based searching. The directory service searches for and returns the objects that satisfy the search filter. For example, a simple query might ask the directory service to find all printers that have color laser printing capabilities.

Novell's NetWare and e-Directory are LDAP enabled directory-based identity management systems that centralize the management of user identities, access privileges and other network resources. A Service Advertising Protocol (SAP) is used within NetWare systems to identify services and addresses of servers attached to the network. Among these services can be services of multi-function devices such as printers and similar devices.

Besides the above described, systems and protocols, Sun Microsystems has developed JINI technology as an attempt to provide a simple mechanism for enabling devices to plug together and form an impromptu community, a community that is put together without any planning, installation, or human intervention. In this technology, each device provides services that other devices in the community may use.

Microsoft Corporation has also offered its Universal Plug and Play (UPnP) as an opened standard technology for transparently connecting appliances, PCs, and services by extending Plug and Play to support networks peer-to-peer discovery and configuration. As a subset of UPnP, the Simple Service Discovery Protocol (SSDP) provides a mechanism whereby network clients with little or static configuration can discover desired network services.

The need to be able to offer services in a network environment is underscored by the efforts being made by major corporations such as Microsoft Corporation and Sun Microsystems. Microsoft has recently offered its .NET environment, which is an environment of software technologies for connecting people, systems and devices. It is intended to allow a new level of software integration through the use of web services. Sun Microsystems has offered, as a counterpoint, its Sun Open Net Environment (Sun ONE) as a standards-based software vision which is an environment for building and applying services on demand. It is a foundation for the next generation of distributed computing models such as web services.

The issue of offering device services in a network environment has become important enough that many corporations are joining together in forming forums for the development of common standards. For example, there is a Universal Plug and Play forum which is attempting to define and publish UPnP device and service descriptions in order to enable the emergence of these LAN connected devices and simplifying implementation of corporate networks. The Universal Plug and Play Forum is group of companies and individuals across multiple industries including: consumer electronics, computing home automation home security, appliances, printing, photography, computer networking and others.

The Salutation Consortium has been formed as a non-profit corporation with a goal of promoting and distributing royalty free and via open source a Salutation architecture that is a service discovery and session management protocol developed and sponsored by leading information technology companies. Salutation architecture is intended to be independent of operating system communication protocol or hardware platform. It is meant to provide an information exchange among and between different wireless handheld devices and office automation equipment. It is an industry initiative in order to create a platform independent open framework for describing services and discovering services using the Internet as a cross-industry effort driven by all major platform and software providers.

As new systems are developed for offering service advertising and service discovery, an attempt is underway across the industry to provide standardized protocols for performing these services. Among these protocols is the Services Location Protocol (SLP) which was standardized in the Internet Engineering Task Force (IETF) for providing automatic client configuration for applications and advertisement for network services. Among the charters within the IETF is an Internet Printing Protocol (IPP) charter. There are currently no universal standards for printing and several protocols are in use, but each has limited applicability and none is considered the dominant one. This means that printer vendors have to implement and support a number of different protocols and protocol variances. The Internet Printing Protocol is a client/server type protocol which is intended to allow the server side to be either a separate print server or a printer with embedded networking capabilities. The IPP working group is attempting to define a set of directory attributes that can be used to find printers on the network and to include mechanisms ensuring adequate security protection from materials being printed.

As communications, protocols, and message formats are standardized, in the web community it becomes increasingly possible and important to be able to describe the communications in a structured way. Web Services Description Language (WSDL) addresses that need by defining an XML grammar for describing network services as collections of communication endpoints capable of exchanging messages. WSDL service definitions provide documentation for distributed systems and serve as a recipe as automating the details involved in applications communication. A WSDL document defines services as collections of network endpoints or ports. A port is defined by associating a network address with a reusable binding, and a collection of ports defines a service.

It is within the rich variety of above-described environments and protocols that concepts of the present invention can be suitably and advantageously employed. A method will be described herein that uses a service description associated with a device advertisement as a template for the creation of a hosted service. The service description is, in essence, an electronic document describing capabilities and interface requirements of device resident services offered by the device. The service generator on the host will create necessary objects on the host to realize a service that will front-end the device. The service generator may also augment the basic service that the device offers in order to provide a richer and more capable service. Once the hosted service has been instantiated, the service generator will then publish the new service in the appropriate directory.

FIG. 1 is an illustration of a networked computing system 10 including a host computer 12, a network attached device 14, a directory service 16 and a client 18. Among the processes operating in host computer 12 are: an advertisement listener process 20 and a service generator process 22. The network connected device 14 includes software which offers a device service 24. The advertisement listener process 20 listens in an environment specific manner for a device service. Examples of environment specific manner include, but are not limited to: listening for SSDP advertisements in a UPnP environment or listening for SAP advertisements in a NetWare environment. The advertisement listener 20 invokes an appropriate service generator 22 based on the advertised device service 24. The service generator 22 is specific to a class of device services for which it will create a hosted service 26. Service generators are automata with knowledge of basic and composite services and the ability to instantiate a hosted service that makes use of device and other hosted services.

Once informed of the existence of a device service 24, the service generator 22 determines the capabilities of the device service. This also happens in an environmentally specific manner. Examples include: receiving a Device Description Document/Service Control Protocol Document (DDD/SCPD) in a UPnP environment for retrieving the printer attributes via a "GetPrinterAttributes" call in an Internet Printing Protocol (IPP) environment. Once the service generator 22 knows the capabilities of the device service 24, a new service 26 on the host 12 is created and advertised. The service generator 22 can be fully automated or can be under operator control. New composite services created may make use of other services within host 12 to provide a richer set of features than the device service 24 offers. New composite services may optionally also take advantage of other services on the network not within host 12 in order to add new features to the features offered by the device service.

Figure 2:
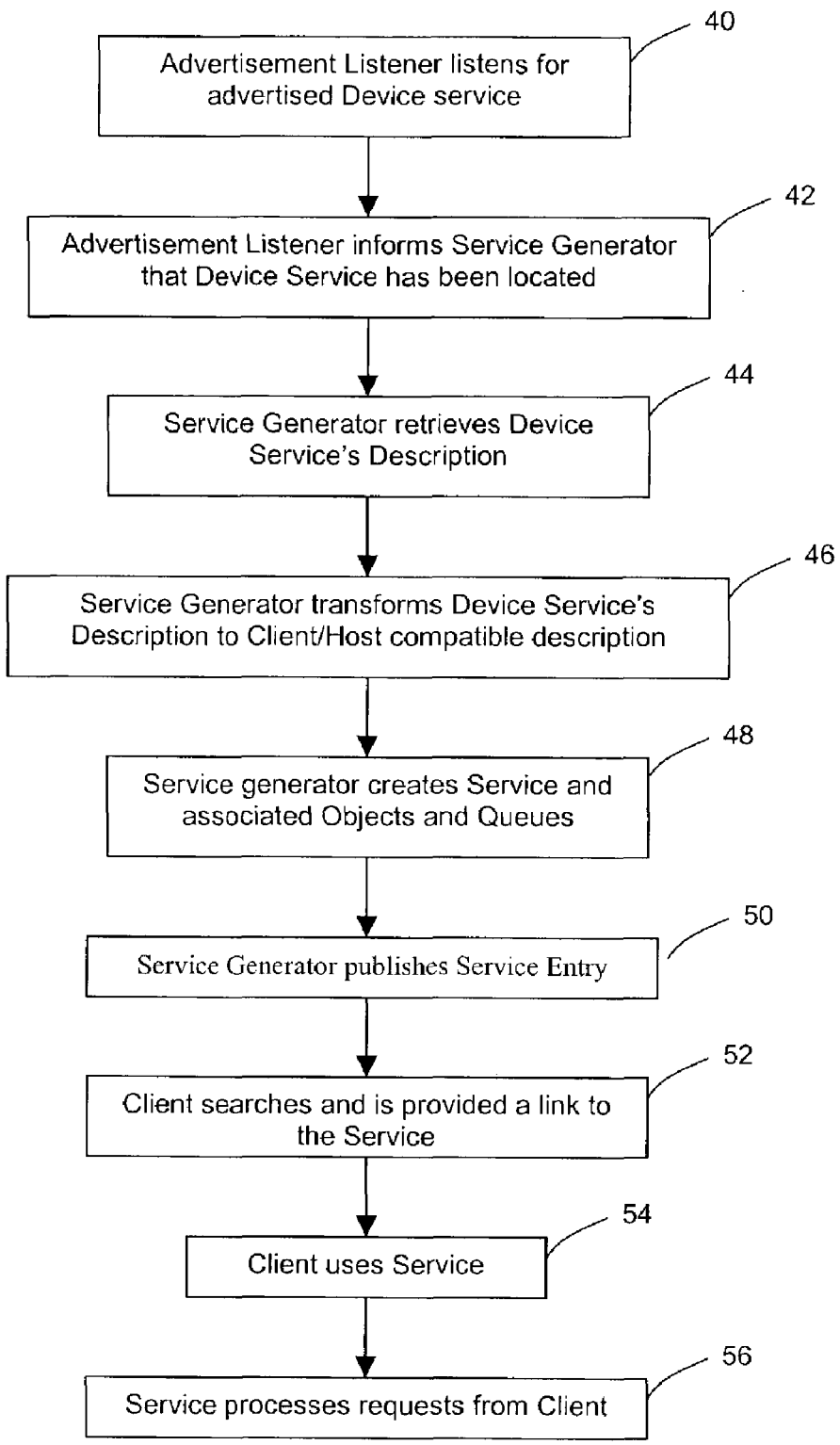
FIG. 2 is a flow diagram illustrating a preferred embodiment of the present invention.

FIG. 2, with continuing reference to FIG. 1, is a flow diagram illustrating steps required to create a hosted service, i.e. proxy for a device resident service. Users of the device resident service, therefore, do not communicate directly with the device. Instead, users see the proxy as if it were a device resident service and communicate with the proxy rather than directly with the device. In step 40, the advertisement listener process 20 listens in an environment specific manner for a device service 24. Listening in an environment specific manner might include, for example, listening for SSDP advertisements in a UPnP environment or SAP advertising in a NetWare environment.

In step 42, the advertisement listener 20 informs an appropriate service generator 22 that an advertised device service 24 has been located. In a preferred embodiment, the service generator(s) 22 are service type specific wherein each service generator 22 will generate services for a specific class of devices. Classes of devices might include, for example, xerographic printers, ink jet printers, fax machines, etc.

In step 44, the service generator 22 retrieves the Device Services Description 28 in an environment specific manner. For example, the service generator might receive a DDD/SCPD in a UPnP environment or it might retrieve the printer attributes via a "GetPrinterAttributes" call in an IPP environment.

In step 46, the service generator 22 transforms the description 28 obtained from the device into a form usable in the environment common to the client and the host and makes the usable form available. Examples here include: a WSDL file in a Web Services environment for the creation of a service template in an SLP environment.

In step 48, service generator 22 creates the service 26 and any associated objects or queues 32 required for this service's operation. The service generator 22 is not only specific to the device service 24 class, but it is also familiar with the service 26 and associated objects in queues 32 that it is creating and associating with the device service 24. Additionally, the service 26 is aware, not only of its association with the device service 24, but also with any other service it may use to augment the capabilities of the device service 24. For example, the service generator 22 may instantiate an enhanced printer due to its ability to combine a simple print service and a transformation service. To the end user, the enhanced printer can now accept a wider range of document types. The hosted composite service uses the transformation service to convert the document stream into a format acceptable to the printer.

In step 50, service generator 22 publishes its service entry 34 in an environment specific manner. Service entry 34 describes the capabilities of the service 26 either directly or indirectly through a reference to the description 30. Examples here include: an entry in a Universal Description Discovery and Integration (UDDI) registry for the Web Services environment or a directory entry in Novell's NDS for a NetWare environment.

In step 52, a client 18 searches for a required service 26 having desired capabilities. The result in service entry 34 provides a link to the service 26. Examples of this include: browsing a UDDI registry in the Web Services environment or performing an LDAP query in a NetWare environment.

In step 54, the client then uses the service 26 in an environment specific manner. Examples uses include: initiating a SOAP request in a Web Services environment or sending a "PrintJob" request in an IPP environment.

In step 56, the service 26 processes requests from the client 18 by invoking the device service 24 and possibly making use of other local or remote services. Local services would be those services available within host 12 and remote services would be available on other hosts or servers network connected to host 12. Examples of request processing include: issuing a UPnP action in a UPnP environment or invoking a transformation service in a Web Services environment.

It is to be understood that the steps illustrated in FIG. 2, although described singularly and in a chronological fashion, are not restricted in any way by the order of description. For example, the steps of advertising and listening are occurring substantially independently. However, steps, such as informing step 42, only operate when a prerequisite step, such as advertising step 40, have occurred and advertisement listener 20 has recognized an advertised device service 24. It is also to be understood that although FIG. 1 shows a single client, a single device, and a single service, that in preferred embodiments of the present invention, a plurality of devices and a plurality of clients, and a plurality of services will in fact be included in system 10. It is additionally to be understood that the steps shown in FIG. 2 are the most essential steps in embodiments of the present invention. Additional steps not shown in FIG. 2 will include such steps as removing a service 26 when, and if, service generator 22 and/or service 26 recognize that the device service 24 offered by device 14 has become unavailable or inoperative.

Described, therefore, is a host-resident listener that receives advertisements of services offered by peripheral devices and then creates a proxy for each of these devices. This, in turn, allows the service to be enhanced. For example, a basic print service gets advertised, a host-based listener receives the service and augments the service with additional capabilities such as print transforms, additional transforms, and the service is then made available in a richer environment in terms of service functionality. The host-based listener can, additionally, pool the services offered by the plurality of printers and then offer the service to users as if it were a single printer with enhanced printing capabilities. The host-based service also takes advantage of the security features of the particular operating system. The host based listener can be configured to restrict the services that it forwards to the service generator to limit the exposure of the system to security breaches that might be inherent in a particular device service.

While the invention has been described with respect to specific embodiments by way of illustration, many modifications and changes will occur to those skilled in the art. It is therefore, to be understood that the appended claims are intended to cover all such modifications and changes which fall within the true spirit and scope of the invention.

What is claimed is:

1. A method for automated proxy creation of device resident services on a computer system, the method comprising:
listening for device service advertisements, wherein the listening is performed by an advertisement listener operating on a host computer;
informing a service generator of a first service located by the advertisement listener, the first service located on a peripheral device connected to the host computer by means of a network;
retrieving by the service generator of a device service description for the first service from the peripheral device;
creating by the service generator of a composite service operating on the host computer, wherein the composite service acts as a proxy for the first service, the creating including:
augmenting the composite service with additional capabilities not available from the first service, wherein the composite service includes the capabilities available from first service and the additional capabilities, wherein the additional capabilities include only host-based capabilities, and wherein the composite service is provided using only the host-based capabilities and the capabilities available from the first service;
publishing by the service generator of a service entry, wherein the service entry describes capabilities of the composite service including capabilities available from the first service and the additional capabilities not available from the first service;
searching for a required service by a client or other user, wherein the service entry provides a link to the composite service;
requesting services from the composite service, wherein the requesting is performed by a client or other user of the service; and,
processing service requests by the composite service, wherein the composite service utilizes the first service and the additional capabilities while processing the service requests.

2. The method according to claim 1 further including the step of transforming by the service generator of the device service description to an environment specific format.

3. The method according to claim 1, wherein the listening is performed in an environment specific manner.

4. The method according to claim 1, wherein the service generator comprises a plurality of service generators, and wherein each of the plurality of service generators is service type specific.

5. The method according to claim 1, wherein the creating includes creating objects and/or queues associated with the hosted service.

6. The method according to claim 1 wherein the publishing is performed in an environment specific manner.

7. The method according to claim 1 wherein the requesting is performed in an environment specific manner.

8. The method according to claim 1 wherein the processing is further performed by one or more associated services.

9. The method according to claim 1 further including the step of restricting the services of a particular device that the advertisement listener informs the service generator of in order to limit exposure of the computer system to security breaches inherent in a particular device service.

10. A system providing automated creation of device resident services, the system comprising:
a host computer including:
an advertisement listener process for receiving device service advertisements; and,
one or more service generator processes linked to the advertisement listener for receiving information about advertised device services and creating hosted services acting as proxies for the device services, wherein the service generator processes add augmented capabilities to each of the hosted services not available from the associated device service, wherein the hosted service and the associated device service jointly provide services to a client, wherein the jointly provided services include capabilities available from the associated device service and the augmented capabilities, wherein the augmented capabilities include only host-based capabilities, and wherein the jointly provided services are provided only by the host-based capabilities and the associated device service;
a publishing process utilized by the service generator to publish a service entry for each of the hosted services, the service entry describing capabilities of the associated hosted service, wherein the service entry describes both of the capabilities available from the device service and the augmented capabilities not available from the device service; and,
one or more peripheral devices operatively linked to the host computer by a network, each device including:
a peripheral device service capable of offering services to a user, wherein the device advertises the peripheral device service to the host computer as one of the advertised device services; and,
a device service description means describing capabilities of the device and the peripheral device service, wherein the device service description means is retrieved by the service generator, and wherein the service generator creates a hosted device service operating on the host computer acting as one of the hosted services as a proxy for the peripheral device service.

11. The system as set forth in claim 10 further including:
a directory service, wherein the directory service maintains a directory service table having a service entry for each hosted service published by the publishing process; and,
one or more clients wherein each client may search for and select a required service in the directory service table, and wherein the selected service entry serves as a link to the corresponding hosted service which may be used by the client.

12. The system as set forth in claim 11 further including:
transformed service descriptions, wherein the service generator stores each retrieved device service description after transforming it to a format usable in the host computer.

13. The system as set forth in claim 12 wherein the service generator creates a service queue and/or a service object for each created hosted service.

14. The system as set forth in claim 12 wherein the selected hosted service provides all services to the client.

15. The system as set forth in claim 12 wherein the selected device service provides all services to the client.

16. The system as set forth in claim 12 wherein the advertisement listener is configured to limit exposure of the computer system to security breaches inherent in a particular device service by restricting information received by the service generator processes about the particular device service.

17. The system as set forth in claim 10 wherein the one or more peripheral devices include one or more electrophotographic machines.

18. A method for automated proxy creation of device resident services on a computer system, the method comprising:
  publishing a device service advertisement over a network by at least one peripheral device of a device service available from the at least one peripheral device;
  listening for the device service advertisement, wherein the listening is performed by an advertisement listener operating on a host computer;
  selecting a service generator from a plurality of service generators, wherein the selected service generator is appropriate for the device service available from the peripheral device;
  identifying restricted services included in the device service;
  limiting exposure of the computer system to security breaches inherent in the restricted services by excluding the identified restricted services from a set of selected services of the device service;
  informing the selected service generator of the selected services of the device service, wherein the selected services are located on the peripheral device connected to the host computer by means of a network;
  retrieving by the service generator of a device service description for each of the selected services from the associated peripheral device;
  creating a composite service for each of the selected device services by the service generator, the composite service operating on the host computer, and the composite service acting as a proxy for the associated selected device service, the creating including:
    augmenting the composite service with additional capabilities not available from the associated selected device service, the additional capabilities including invoking a transformation service in a Web Services environment, wherein the composite service includes the capabilities available from the selected device service and the additional capabilities, wherein the additional capabilities include only host-based capabilities, and wherein the composite service is provided only by the host-based capabilities and the selected device service;
  publishing by the service generator of a service entry for each composite service, wherein the service entry describes capabilities of the composite service, the capabilities of the composite service including selected capabilities of the associated selected device service and the capability of invoking the transformation service in the Web Services environment;
  searching for a required service by a client or other user, wherein the service entry provides a link to the composite service;
  requesting services from the composite service, wherein the requesting is performed by a client or other user of the service; and,
  processing service requests by the composite service, wherein the composite service utilizes the associated selected device service and the additional capabilities of the composite service while processing the service requests.

* * * * *